United States Patent [19]

Ward

[11] 4,186,806

[45] Feb. 5, 1980

[54] PLOW SYSTEM

[75] Inventor: Gerald G. Ward, Naperville, Ill.

[73] Assignee: International Harvester Company, Chicago, Ill.

[21] Appl. No.: 830,713

[22] Filed: Sep. 6, 1977

[51] Int. Cl.$^2$ .................... A01B 69/00; A01B 59/044
[52] U.S. Cl. .................................. 172/283; 172/324; 172/647; 280/468
[58] Field of Search ............... 172/283, 315, 324, 325, 172/326, 327, 287, 284, 647, 166; 280/468

[56] References Cited

U.S. PATENT DOCUMENTS

| | | | |
|---|---|---|---|
| 722,261 | 3/1903 | Stewart | 172/647 |
| 2,130,274 | 9/1938 | Harrison et al. | 280/468 |
| 2,564,567 | 8/1951 | Ego | 172/166 |
| 2,982,363 | 5/1961 | Sweet et al. | 172/284 |
| 3,817,333 | 6/1974 | Kinzenbaw | 172/283 |
| 3,918,528 | 11/1975 | Kinzenbaw | 172/283 X |
| 4,036,305 | 7/1977 | Kinzenbaw | 172/283 |
| 4,036,306 | 7/1977 | Kinzenbaw | 172/287 |
| 4,049,063 | 9/1977 | Dietrich | 172/283 |

FOREIGN PATENT DOCUMENTS

| | | | |
|---|---|---|---|
| 481234 | 2/1952 | Canada | 172/647 |
| 822472 | 11/1951 | Fed. Rep. of Germany | 280/468 |

Primary Examiner—George J. Marlo
Attorney, Agent, or Firm—James J. Getchius; Neal C. Johnson; F. David AuBuchon

[57] ABSTRACT

A variable width furrow-spacing plow system embodied in an implement having a laterally adjustable tractor hitch, an angularly adjustable plow-carrying main frame, and hydraulic means for correlating the lateral movement of the hitch and angular position of the frame, to the end that for any given furrow spacing the hitch point of the implement will fall closer to the line of pull than has heretofore been possible, and minimum pulling force will be required to motivate the implement. The system embodies a pull bar or frame which has its forward end pivoted to the adjustable tractor hitch and its rear end pivoted to a medial region of the plow-carrying frame. A hydraulic ram controls the lateral adjustment of the hitch, while a second ram controls the angularity between the pull frame and the main frame. The two rams are phased for operation in unison under the control of a valve in the cab of the tractor. A third ram which also is phased with the two other rams, controls the attitude of a trailer section, and maintains such section in line with the direction of travel of the tractor.

7 Claims, 4 Drawing Figures

PLOW SYSTEM

The present invention relates to agricultural implements and has particular reference to a plow system of the type wherein a plurality of plow units are mounted at predetermined intervals on an elongated frame which is adapted to be pulled behind a tractor, and in which means are provided for adjusting the inclination of the frame relative to the direction of travel of the tractor, to the end that as the angle between the frame and such path of travel is changed, the component of lateral spacing between adjacent plow units will be commensurately changed to vary the distance between adjacent furrows which are undergoing plowing.

Plow systems of the character set forth above (which for brevity of description will be referred to herein as variable width plows) have recently come into favor in that they are possessed of at least one distinct advantage, namely that the plow units associated therewith are capable of collective positional adjustment under the control of an operator in the tractor while the tractor is in actual use, thus obviating the necessity of the operator having to dismount for the purpose of making numerous bolt hole changes or other adjustments.

Variable width plows which depend upon varying the angularity of their plow frames or beams for lateral spacing of adjacent plows have been found to be reasonably satisfactory within certain limits of width spacing but, where extremes of spacing is required, they have been found difficult to steer or pull.

A plow or other ground working implement has a center of resistance which depends upon numerous factors such as the positioning of the plow units, the shape of the plow bottoms, soil conditions acting upon the various plow bottoms, and other factors too numerous to mention. It is well known that during the operations of such an implement, the location of the vertical pivot post connection between the tractor and plow is established by placing it on the line of pull. Present day variable width plows employ a rigid pull frame and therefore a rigid pivot post which can be manually set with tools or pinned at an optimum location for an average width of furrow setting. Since the center of resistance changes drastically at the extreme wide, or narrow settings, this fixed setting is no longer optimum or desirable. In adverse conditions, such a fixed setting, can cause difficulties with the plow or with the tractor steering and pull.

The present invention is designed to overcome the above-noted limitation that is attendant upon the construction and use of present day variable width plow systems and, toward this end, the invention contemplates the provision of a plow system wherein, the lateral movement of the hitch relative to the plow bottoms and the lateral movement of the hitch relative to the tractor, to the end that for any given furrow spacing, the hitch point will more properly fall on the line of pull than heretofore has been possible, and better tractors steering and control will result as well as improved plow reaction. This is achieved by utilizing an articulated frame structure. Such structure embodying a plow-supporting main frame which has its medial region pivoted to the rear end of a pull frame or beam. The forward end of the pull frame is pivoted to a laterally shiftable hitch point on the tractor. A hydraulic cylinder and plunger (hydraulic ram) which is operable under the control of a valve in the cab of the tractor controls the lateral position of the hitch point and another hydraulic cylinder is effective between the pull frame and main frame to positively vary the angle between the two frames. A series of equally spaced plow units are ganged together by guide links for collective rotation about respective vertical axes on the main frame so that as the inclination of the main frame relative to the path of travel of the tractor increases, the lateral spacing between adjacent plow units will be varied. The guide links are responsive to the angle between the main frame and the plow frame so that as such angle changes, the plow units change their attitude in unison. Unlike present day variable width plow systems where the plow units are mounted on a fixed pull frame, the present implement, having an articulated frame, is not subject to the wide lateral offset hitch misalignments that it is when a rigid frame is employed. To accomplish this, the aforementioned hydraulic rams are phased together in such a manner that they thereby establish a new hitch point which is more properly aligned for the newly established center of resistance and therefore more in line with the resultant line of pull than would be the case if the hitch point remained stationary.

A trailer section is pivotally mounted on the rear end of the main plow-carrying frame and it is provided with a support wheel which normally travels in the last formed furrow. Hydraulic lift means are embodied in the trailer section for adjusting the height of the rear end of the main frame relative to the support wheel, thereby, withdrawing the plow units from the ground for transport purposes. When the plow units are thus raised, a series of steering links extend between the tractor and the axle of the support wheel and are effective to bring the rear region of the plow system around behind the tractor when making turns.

Entirely apart from the steering system, a third hydraulic ram is phased with the first and second hydraulic rams, this third ram functioning automatically and in a novel manner to change the angularity of the longitudinal axis of the trailer section relative to the longitudinal axis of the main frame in such a manner that the trailer section at all times lines up with the direction of travel of the tractor, regardless of the angularity of the main frame with respect to such direction of travel. Such hydraulic control of the attitude of the trailer section for different furrow width spacings constitutes a further feature of novelty of the present invention.

The provision of a plow system such as has briefly been described above, and possessing the stated advantages, constitutes the principal object of the present invention. Numerous other objects and advantages, not at this time enumerated, will readily suggest themselves as the nature of the invention is better understood.

In the accompanying four sheets of drawings forming a part of this specification, one illustrative embodiment of the invention has been shown.

In these drawings:

FIG. 4 is a diagram illustrating the adjustment of lateral spacing between adjacent plow units in terms of linear and angular considerations which become effective automatically when width changes are resorted to.

Before entering into a detailed discussion of the structural features of the present invention, it is deemed pertinent to state that in the following description the terms "right side" and "left side" are used with reference to the path of travel of the tractor when standing rearwardly of same and looking forwardly toward the rear end of the tractor.

Figure 1:
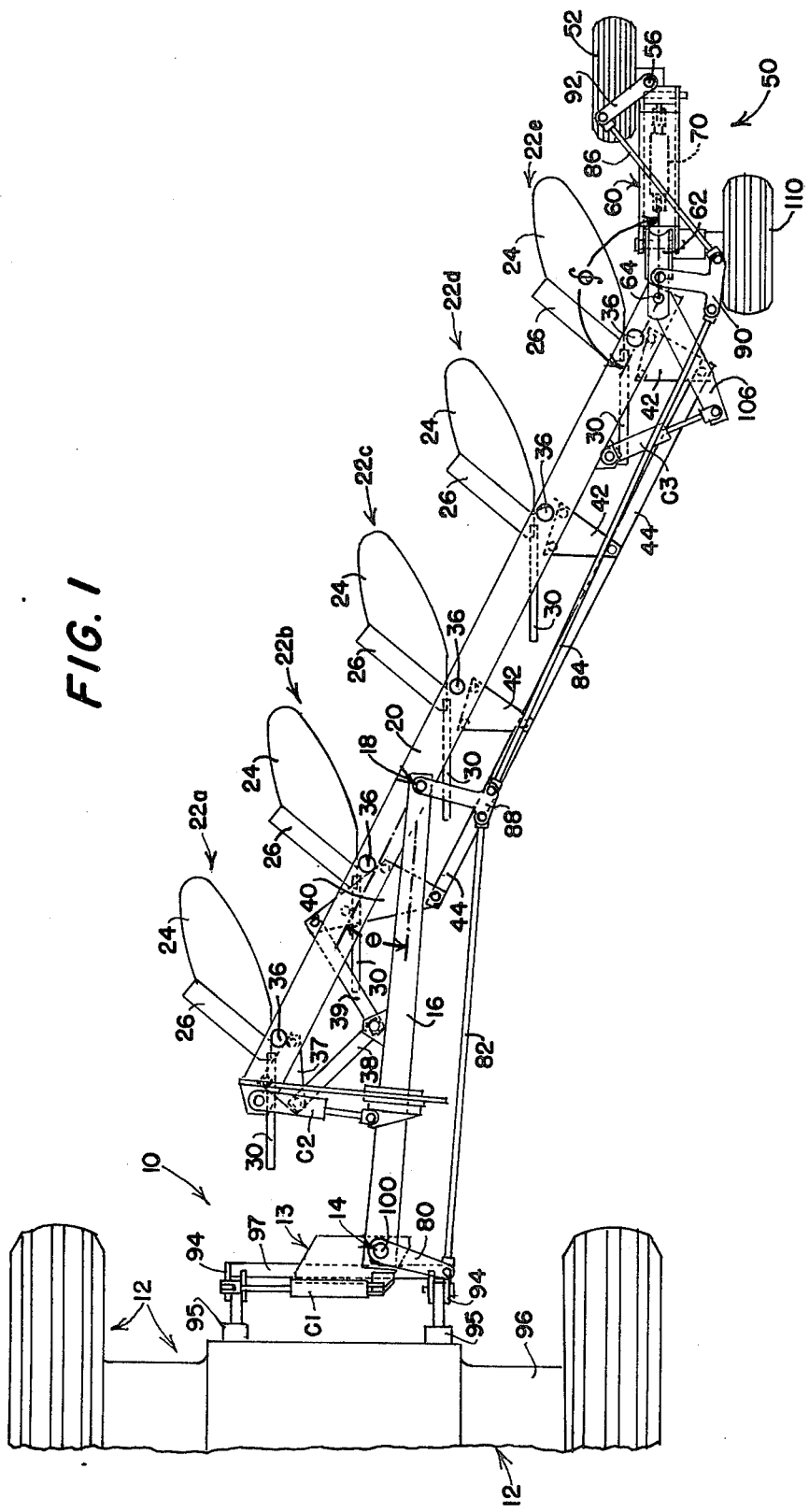
FIG. 1 is a plan view, largely schematic in its representation, of a plow system embodying the principles of the present invention and showing the same operatively connected to a motivating tractor.

Referring now to the drawings in detail, and in particular to FIG. 1 briefly the plow system of the present invention involves in its general organization a hitch assembly 10 designed for connection to the rear end of a tractor 12, and including a laterally shiftable or adjustable hitch block 13 which provides a pivotal connection 14 for the forward end of a pull frame or bar 16. The rear end of the pull frame 16 has a pivotal connection 18 with the medial region of a main frame 20. Both the pull frame 16 and the main frame 20 are in the form of elongated linearly straight beams, preferably of hollow rectangular tubular construction.

Pivotally mounted on the main frame 20 at equally spaced points therealong are a plurality of plow units or bottoms, each of which has been designated in its entirety by the reference numeral 22. The various plow units 22 are of more or less conventional construction and they have been illustrated herein with but little detail. Since they are all identical, a brief description of one of them will suffice for them all. The plow units 22 may be of the general type shown and described in U.S. Pat. No. 3,321,027, granted on May 23, 1967 and entitled "Self Restoring Plow Trip," and for a full understanding thereof, reference may be had to such patent. However, for purposes of discussion herein it is deemed sufficient to state that each unit embodies the usual moldboard 24, plow share 26, and coulter disk 28, the latter underlying a coulter bar 30. Since the specific nature of the various plow units or bottoms 22 per se constitutes no part of the present invention, such units have been fragmentarily shown in the different views. For example, in FIGS. 2 and 3, although the coulter disks 28 have been shown, they have been omitted from FIG. 1 in the interests of clarity.

The plow units 22 are of the self-restoring trip type such as is illustrated in the aforementioned U.S. Pat. No. 3,321,027, portions of the various trip mechanisms associated therewith appearing in FIG. 2 but being omitted in FIG. 1 in the interests of clarity. Such trip mechanisms include dual spring units 32 and toggle devices 34 which are associated therewith but which require no detailed description since they are not germane to the present invention. Each of the plow units or bottoms 22 is capable of bodily swinging movement about a vertical pivotal connection 36 with the main frame 20.

In the illustrated form of the present plow system, five plow units 22 are disclosed although it will be understood that a greater or a lesser number thereof may be employed if desired. Three of these units are pivotally mounted on the main frame 20 rearwardly of the pivotal connection 18 for the pull frame 16, while the two leading plow units are mounted on the main frame 20 forwardly of the connection 18. Means are provided whereby all of the plow units 22 are constrained to turn in unison about their respective pivotal connections 36. Furthermore, the extent of turning movement of the various plow units 22 is a function of the angle which is subtended between the axis of the pull frame 16 and the axis of the main frame 20 and which has been designated $\theta$ in FIG. 1.

Accordingly, insofar as the leading plow unit 22a is concerned, a generally triangular shaped crank arm 37 is connected to the plow unit and projects laterally therefrom beyond the right side of the main frame 20 and is pivotally connected to one end of a draw link 38. The other end of the draw link 38 is pivotally connected to a medial region of the pull frame 16. Thus it will be observed that as the angle $\theta$ between the main frame and the pull frame increases, the draw link 38 will swing the plow unit 22a in a counterclockwise direction as viewed in FIG. 1.

Insofar as the second plow unit 22b is concerned, this unit receives its turning movement from the leading plow unit 22a by reason of a second draw link 39 (FIG. 1) which is pivoted at one end to the pull frame 16 and at its other end to one corner region of a generally triangular crank arm 40, such corner region overhanging the right side of the main beam 20. Thus, as the angle $\theta$ increases, the plow unit 22b swing counterclockwise in unison with the plow unit 22a.

Insofar as the three rearmost plow units 22c, 22d, and 22e are connected, each of these units are provided with a generally triangular crank arm 42 which projects outwardly of the left side of the main frame 20. The projecting corner of each of the three crank arms 42 is pivotally connected to an elongated guide bar 44 so that as the latter is shifted generally in an endwise direction, the three plow units 22a, 22b and 22c rotate in unison abut their respective pivot connections 36. The forward end of the guide bar 44 is pivoted to a second corner region of the crank arm 40, such corner region projecting outwardly from the left side of the main frame 20 and thus, as the plow unit 22b rotates under the influence of the draw link 39, the guide bar 44 is shifted generally endwise so that the three plow units 22c, 22d and 22e are rotated in unison with the plow units 22a and 22b and in the same direction.

Figure 2:
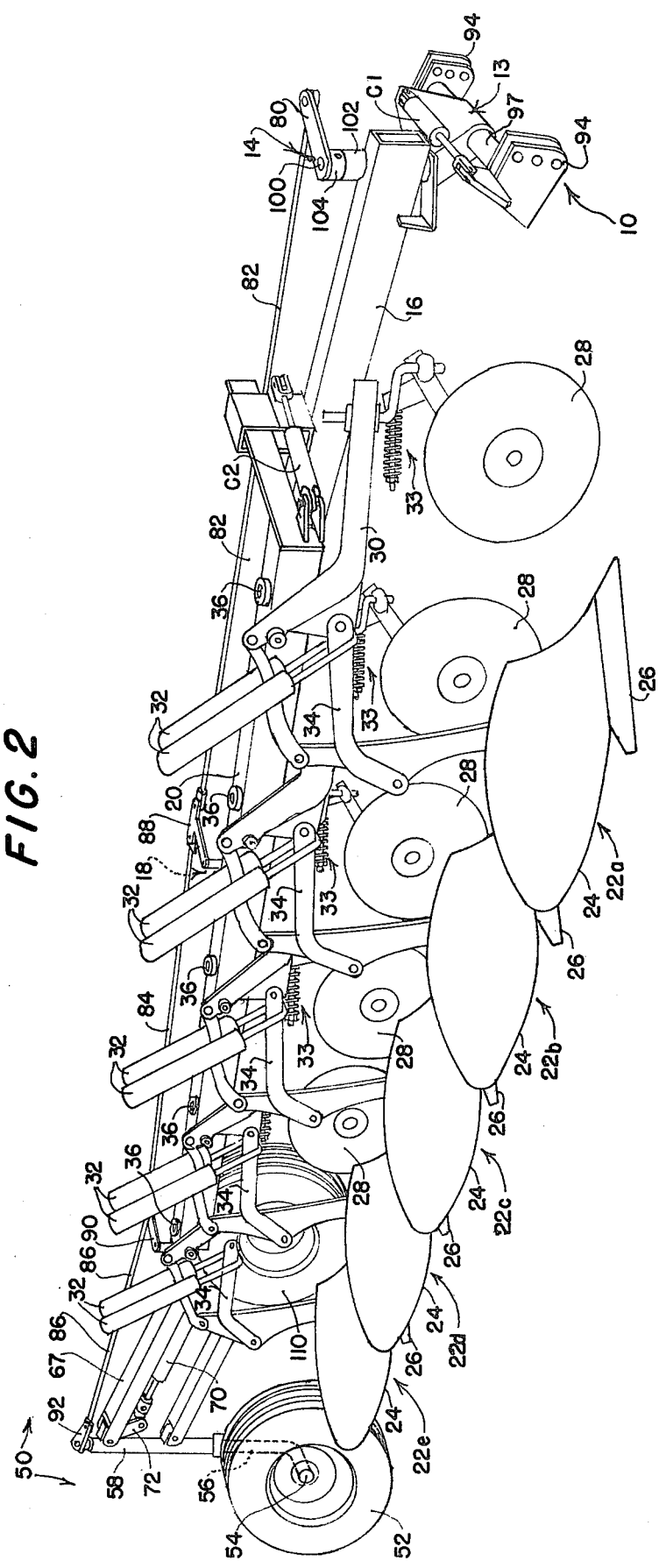
FIG. 2 is an upper right side perspective view, likewise largely schematic, of the plow systems of FIG. 1.
Figure 3:
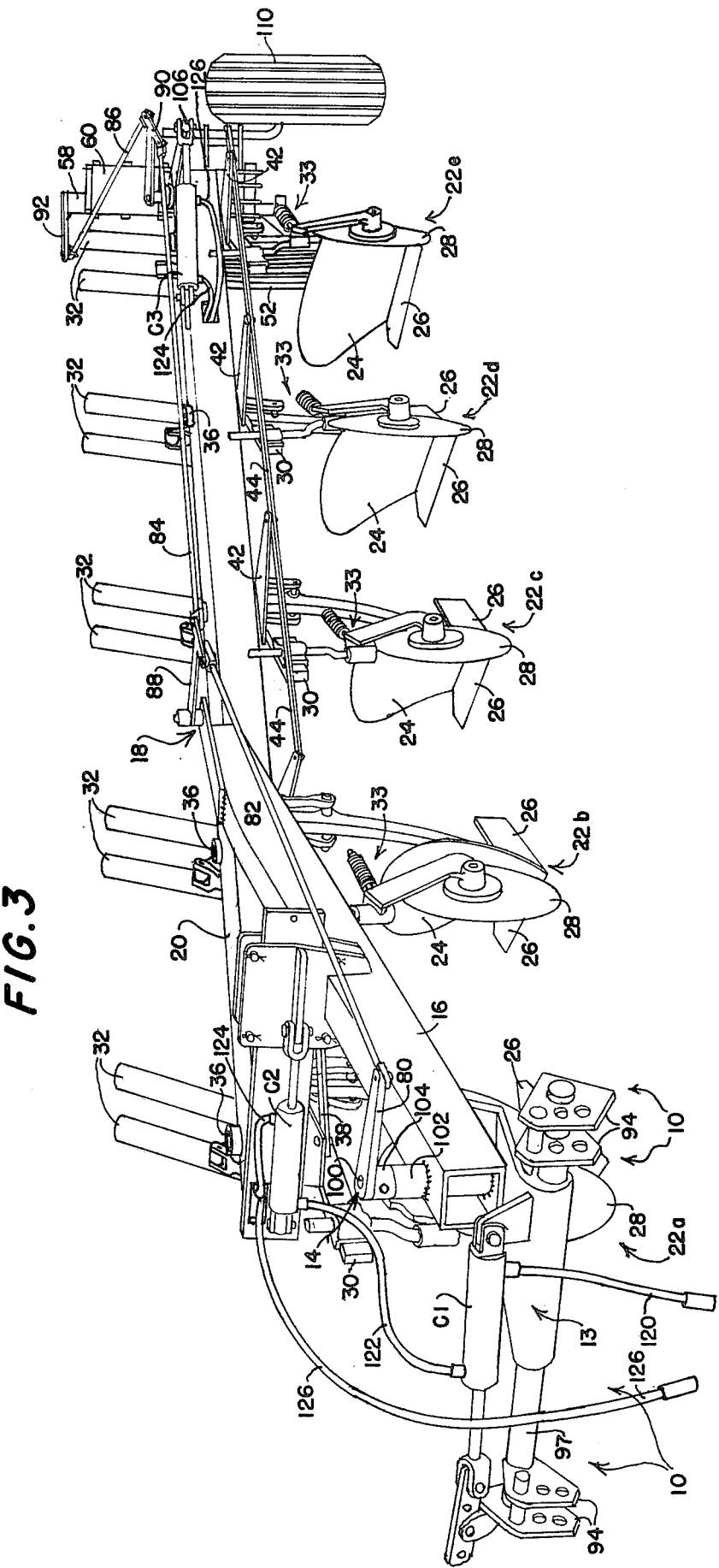
FIG. 3 is a left side perspective view of the structure shown in FIG. 1.

As shown in FIGS. 1 to 3, inclusive, the rear or trailing end of the main beam 20 is supported by a trailer section 50 which carries at its rear end a steerable support wheel 52 located in such a manner that it follows the furrow which is formed by the rearmost plow unit 22 during plowing operations. The wheel 52 has associated therewith an axle 54 (FIG. 2) having an upturned extension 56 which projects through a vertical bearing sleeve 58, the latter constituting the rear side of a parallelogram-like four bar linkage support 60. The front vertical side of the four bar linkage support 60 is in the form of a frame-like structure 62 which embodies a hinge connection 64 by means of which the trailer section 50 as a whole is pivoted to the rear end of the main beam 20. A lift cylinder or hydraulic ram 70 has its plunger end pivoted to a torque lug 72 (FIG. 2) which is welded to the upper bar of the four bar linkage support 60 and has its cylinder end pivoted to the structure 62. Thus, as the lift cylinder 70 is extended, the parallelogram-like linkage support 60 is actuated in such a manner as to raise the wheel 52 relative to main beam 20 or, conversely, to lower the main beam for plowing purposes. When the lift cylinder 70 is contracted, the linkage 60 is actuated in such a manner as to raise the rear end of the main beam 20 and withdraw the plow units 22 from the ground, in which case the wheel 52 functions as a traction wheel for transport purposes.

Whether the wheel 52 is in its plow-raising or its plow-lowering position, steering means are effective whereby such wheel will automatically be steered in a direction opposite to that in which the tractor may be turning so that the trailer section 50 will swing around behind the tractor and the trailing end of the main beam 20 will move outwardly and be maintained behind the tractor in a manner similar to the steering of an extremely long fire truck or a similar vehicle. Accordingly, and as best shown in FIG. 1, a crank arm 80 has its proximate end effectively fixed through the medium of the hinge connection 14 to a point on the laterally adjustable hinge block 13 in a manner that will be described in greater detail presently, such crank arm overhanging the left side of the pull frame 16. A linkage system including three elongated steering links 82, 84, and 86 are connected together in end-to-end fashion by means of T-bar connectors 88 and 90 appropriately pivoted to the pull frame 16 and the frame-like structure 62 of the four bar linkage support 70. The forward tie rod 82 has its front end pivoted to the distal end of the crank arm 80 while the rear end of the rearmost tie rod 86 is pivoted to a steering knuckle 92 which is mounted on the upper end of the vertical upturned extension 56 of the axle 54 of the steering wheel 52. Thus it will be seen that as the tractor 12 and its hitch 10 turn in one direction or the other, the crank arm 80 will follow the turning motion of the hitch block 13, but in the opposite direction, thereby placing the tie rods 82, 84 and 88 either under compression or under tension, depending upon the direction of turning movement of the tractor. For example, if the tractor turns to the left, the tie rods will be placed under compression and their endwise displacements will be such that the steering knuckle 92 will turn in a clockwise direction as viewed in FIG. 1 so as to shift the wheel axle 54 in a direction which will guide the tail section to the right. If the tractor turns to the right, the tie rods will be placed under tension and the wheel axle 54 will turn in a counterclockwise direction so as to guide the tail section to the left.

Considering now in greater detail the nature of the hitch connection 10 and of the pivot connection 14 associated therewith, as shown in FIGS. 2 and 3, such hitch 10 is comprised of a pair of tractor mounts 94 which are bolted to tractor lugs 95 (FIG. 1) provided on the rear axle 96 of the tractor 12. A combined guide rod and hinge bar 97 extends between the tractor mounts 94 and the aforementioned hitch block 13 and has its proximate or front end slidable on the bar 97. The distal or rear end of the hinge block 13 is pivotally connected to the forward end region of the pull bar 16. An hydraulic piston and cylinder assembly (hydraulic ram) C1 has its plunger end effectively secured to the right tractor mount 94 and has its cylinder end effectively secured to the hitch block 13 as clearly shown in FIG. 3. It will be appreciated that when the hydraulic ram C1 is extended, the hitch block 13 will be shifted along the hinge bar 97 to the left and that when such ram is contracted the hitch block will be shifted to the right. The aforementioned hinge connection 14 between the forward end of the pull frame 16 and the hitch 10 embodies an upstanding pivot shaft 100, the lower end of which is fixedly secured to the hinge block 13 and which extends upwardly through a sleeve 102 that extends through the forward end region of the pull frame 16. The aforementioned crank arm 80 has a hub portion 104 which is pinned to the shaft 100 so that it turns with the latter while the pull frame 16 and its associated sleeve 102 is capable of limited swinging movement about the axis of the pivot shaft 100.

The hydraulic ram C1 which controls the lateral position of the pivot connection 14 (which will hereinafter be referred to as the hitch point) is hydraulically phased with two other hydraulic rams C2 and C3 (FIG. 1). The hydraulic ram C2 has its plunger end effectively pivoted to a medial region of the pull frame 16, and its cylinder end effectively pivoted to the forward end of the main frame 20. The ram C2 thus controls the angle $\theta$ which is subtended between the pull frame 16 and the main frame 20. The ram C3 has its cylinder end effectively pivoted to a rear medial region of the main frame 20, and its plunger end effectively pivoted to the distal end of a positioning arm 106 which is fixed to and projects forwardly and to the left from the frame-like structure 62 associated with the four bar linkage support 60 of the trailer section 50. The ram C3 thus controls the angle $\phi$ which is subtended by the longitudinal axes of the main frame 20 and the trailer section 50.

If desired, a second support wheel 110 may be mounted on the forward end region of the trailing section 50 and it is capable of being vertically adjusted by suitable means (not shown) so that it will engage the ground during plowing to limit the depth of the furrows. The use of such depth gauge wheels is well known in the art and, during transport, such wheels are raised from the ground.

As will be described in considerable detail subsequently when the operation of the herein described plow system is set forth, the three hydraulic rams C1, C2 and C3 are hydraulically serially phased together so that by the use of a single control valve in the operator's cab, the three cylinders C1, C2 and C3 may be actuated in unison to vary, firstly the lateral position of the hitch point 14, secondly, the angle $\theta$ (FIG. 1) between the pull frame 16 and the main frame 20, and thirdly, the angle $\theta$ between the longitudinal axes of the main beam 20 and the trailer section 50. The purpose of varying the position of the hitch point 14 and the angles $\theta$ and $\phi$ in this manner is to position and maintain the plow-carrying main frame 20 at the optimum angle with respect to the direction of travel of the tractor 12 so that a proper line of draft will be maintained for each condition of plow unit spacing. The manner in which the spacing intervals of the plow units 22 allows for varying the positions of the furrows throughout discrete increments such as 14 inches, 18 inches and 22 inches will be set forth in detail subsequently with reference to FIG. 4. It will be understood however, that the present plow system permits infinite incremental adjustments or spacing of the furrows without any modification whatsoever of structural parts or rearrangement thereof such spacing being effected solely by proper control valve manipulation on the part of the operator of the tractor.

OPERATION OF THE PLOW SYSTEM

Figure 4:
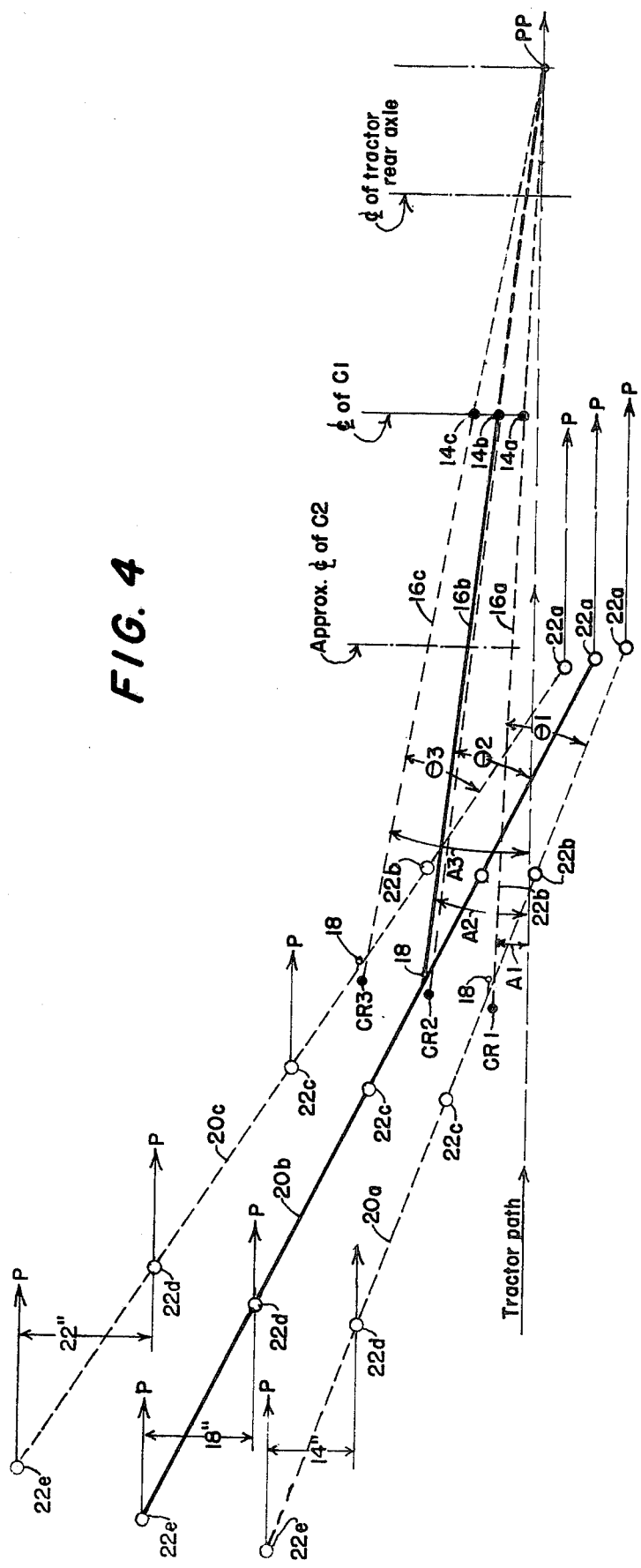

An understanding of the operation of the present plow system will be enhanced by reference to the diagram of FIG. 4. However, before presenting such operation it is believed that certain well known theoretical considerations concerning tillage force analysis with respect to tractor hitching be reviewed briefly and then borne in mind during the ensuing discussion. Directions for hitching trailed implements to a tractor invariably refer to the center of resistance, after which they point out the basic concept that, regardless of how the implement is hitched, a condition of equilibrium will be attained as soil forces adjust themselves so that the hitch point becomes coincident with the line of pull. This results in either the plow not tracking or following properly or more likely in the tractor being difficult to steer and control. For example, a sled which is drawn through snow by a string that has a widely offset attachment point will attain equilibrium when the center of resistance falls on the line of pull, but pulling efficiency will be impaired due to side slipping of the sled runners. Where a ground working implement such as a plow is concerned maximum efficiency is attained when the hitch point is located where minimum pulling force is required to motivate the implement.

In addition to the theoretical fixed point on the implement which represents the center of resistance, another theoretical fixed point on or near the tractor and which is not necessarily coincident with the hitch point is established and this latter point is referred to as the pull point. This pull point, herein designated PP in FIG. 4, in the present plow system line appreciably forwardly of the actual hitch point, i.e. the pivotal connection 14, and it represents the intersection of the various lines of pull that become prevalent when the actual hitch point is shifted laterally from one position to another. For example, when the hydraulic ram C2 (FIG. 1) is actuated either to bring the path of travel of adjacent plow units closer together by decreasing the angle $\theta$, or to spread such paths further apart by increasing the angle $\theta$ (ground conditions remaining constant), new lines of pull will become effective. As represented in FIG. 4, the pull point PP is a fixed point.

At the risk of repetition, it is stated that the present system is capable of infinite variance of furrow spacing. However, for practical considerations it is expedient to describe the invention in connection with discrete spacing of adjacent furrows on 14 inch, 18 inch and 22 inch centers as dimensionally indicated at the left side of FIG. 4. Normally, during operation of the plow system, the pull frame 16 is adapted for small angular movements between a first position wherein it is not quite coincident with the path of travel of the tractor, and represented by the angle A1 for a condition of 14 inch furrow spacing, a second position represented by the angle A2 for a condition of 18 inch furrow spacing, and a third position represented by the angle A3 for conditions of 22 inch furrow spacing. These three angles A1, A2, and A3 are attained when the operator in the tractor manipulates the control valve and appropriately supplies fluid to the hydraulic ram C1. Assuming for purposes of discussion that the system is conditioned for 18 inch furrow spacing as indicated by the positions of the pull frame 16 and main frame 20 in heavy lines in FIG. 4, and assuming that it is desired to convert the system to a 14 inch spacing of furrows, the control valve in the tractor will be manipulated so as to supply fluid to the plunger end of the hydraulic ram C1 with the consequent result that the hitch block 13 and its associated pivot connection 14 will be shifted to the right, while at the same time the hydraulic ram C2 will be contacted so as to decrease the angle $\theta$. The net result will be that the pull frame 16 will be shifted from the position 16b to the position 16a with a consequent decrease of the angle A2 to the angle A1 relative to the path of travel of the tractor (so labelled in FIG. 4). At the same time, due to the phasing between the rams C1 and C2, the angle $\theta$ will assume the magnitude shown at $\theta$1 where 14 inch distances will obtain between adjacent plow units 22. The hydraulic ram C3 will also encounter a contraction for trailer section positioning purposes, thus imparting to such trailer section 50 the necessary directional component or attitude and in a forwardly facing direction as the tractor travels forwardly, all in the manner previously described. The pull frame 16 and the main frame 20 will assume the positions 16a and 20a of FIG. 4 with 14 inch spacing being prevalent between adjacent plow units 22.

Assuming that it is desired to shift the positions of the pull frame 16 and main frame 20 to positions that will accommodate 22 inch spacing between adjacent furrows, the control valve in the tractor will be manipulated so as to supply fluid to the cylinder end of the hydraulic ram C1 and the result will be that the hitch block 13 is shifted to the left. The phasing of the hydraulic rams C1 and C2 will cause the pull frame 16 and main frame 20 to assume the positions 16c and 20c, both of these new positions representing a complete bodily displacement of these frames about the vertical axis of the pull point, and at the same time the hydraulic ram C3 will be extended to shift the trailing section through the medium of the positioning arm 106 (FIG. 1) to its proper position.

With the main frame 20 set at any of its discrete inclinations, grounds are such that as the tractor progresses along its path of travel all of the coulter bars 30 (FIG. 1) will extend in parallelism and the plow units 22 will then progress forwardly in parallel paths variously indicated at P in FIG. 4.

While the angular and distance displacement relationships between the pull frame 16 and the main frame 20 as controlled by the phased hydraulic rams C1 and C2 have been illustrated in FIG. 4, the hydraulic ram C3 has not been shown in this view but is shown in FIG. 1. No novelty is predicated upon the use of interconnected steering links such as the links 82, 84 and 86 of FIGS. 1, 2 and 3. Novelty is attached to the fact that angular shifting of the trailer section 50 is accomplished by the use of a hydraulic ram such as the ram C3 which is maintained in phase with two other rams and with all three rams cooperating with one another to cause the hitch point to become coincident with the line of pull as well as to select furrow spacing distance and proper trailer section orientation.

The term "phasing" as applied to the cylinders C1, C2 and C3 and as used herein refers to placement of these cylinders in a single hydraulic circuit in series relationship wherein, as shown in FIG. 3, the input fluid line 120 leading from a control valve disposed in the cab of the tractor 12 extends to the cylinder end of hydraulic ram C1, while the plunger end of such ram C1 is connected by a fluid line 122 to the cylinder end of the hydraulic ram C2. The plunger end of the ram C2 is connected by a fluid line 124 which passes through a portion of the main beam 20 to the cylinder end of the hydraulic ram C3. The plunger end of the ram C3 is connected by a return line 126 to the control valve in the tractor cab, the line 126 passing through the main beam 20.

Due to the fact that the volume of the cylinder space in the cylinder end of a hydraulic ram is somewhat less than the volume of the cylinder space at the plunger end of the ram, it is necessary, by selective mechanical design or by selecting the internal diameters of the various cylinders and their plungers in accordance with well known engineering exigencies to produce the desired coordinated strokes of the plungers. With piston and cylinder type hydraulic rams of the type under consideration thus phased in series relationship, difficulties arise over a relatively short period of time due to uneven wear of the working parts, especially the fluid seals, in that because of loss of fluid the plunger of one ram may not complete its full stroke in either direction. In other words the rams lose their correctly phased relationship. It is contemplated that in connection with the present system means be provided for automatically re-phasing the various rams without disassembly thereof or other attention being given to the individual rams. One such means constitutes the subject matter of a copending application, D-3291 Ser. No. 834,628, filed on Sept. 19, 1977 by Gerald G. Ward and entitled IMPROVED CYLINDER CONSTRUCTION AFFORDING AUTOMATIC RE-PHASING OF MASTER AND SLAVE CYLINDERS.

From the above description it is believed that the nature and many advantages of the present plow system which provides a laterally adjustable hitch point such as the hitch point 14 on the tractor, together with automatic means whereby when such hitch point is shifted laterally in one direction or the other, correlated linear and angular displacements of the pull beam 16 and main beam 20 relative to the path of travel of the tractor, as well as relative to each other, will automatically take place, all to the end that when each selected width between adjacent furrows has been effected, equilibrium is attained and minimum pull force is required to motivate the implement.

The invention is not to be limited to the exact arrangement of parts shown in the accompanying drawings or described in this specification as various changes in the details of construction may be resorted to without departing from the spirit of the invention. For example, whereas the invention has been illustrated and described in connection with a plow system having five plow units 22, it is obvious that a greater or a lesser number of plow units may be employed. Therefore, only insofar as the invention has particularly been pointed out in the accompanying claims is the same to be limited.

What is claimed is:

1. In a tractor-motivated plow system, in combination, a hitch assembly for attachment to the rear end of a tractor and including a hitch block having a generally vertical hitch pivot, said block being mounted for generally transverse to and fro movement of said block and said pivot relative to the line of travel of the tractor, a first hydraulic ram for moving said block and pivot, a pull frame having its forward end connected to said hitch pivot for limited horizontal swinging movement of the pull frame throughout a small angle, a main frame having a medial region pivoted to the rear end of the pull frame and inclined relative to the latter, a second hydraulic ram effective between the forward end of the main frame and the pull frame for regulating the inclination between the main frame and the pull frame, said first and second hydraulic rams being connected in series for unison but proportional movement about said medial connection, a plurality of plow units mounted on said main frame in longitudinally spaced relationship and on opposite sides of said medial region, said plow units being rotatable about respective vertical axes, and means responsive to the inclination between the main frame and the pull frame for effecting commensurate rotation of said plow units in unison so that their cut lines remain parallel, said latter means embodying a crank arm on each plow unit, draw links connecting the crank arms of adjacent plow units together for movement in unison, and a draw link connecting the crank arm of at least one plow unit forwardly of said medial region of the main frame to the pull frame.

2. In a tractor-motivated plow system, in combination, a hitch assembly designed for attachment to the rear end of a tractor and including a hitch block having a generally vertical hitch pivot, said block being mounted for generally transverse to and fro movement of said block and said pivot relative to the line of travel of the tractor, a first hydraulic ram for moving said block and pivot, a pull frame having its forward end connected to said hitch pivot for limited horizontal swinging movement of the pull frame throughout a small angle, a main frame having a medial region pivoted to the rear end of the pull frame and inclined relative to the latter, a second hydraulic ram effective between the forward end of the main frame and a pull frame for regulating the inclination between the main frame and pull frame, said first and second hydraulic rams being connected in series for unison but proportional movement about said medial connection, a plurality of plow units mounted on said main frame in longitudinally spaced relationship and on opposite sides of said medial region, said plog units being rotatable about respective vertical axes, and means responsive to the inclination between the main frame and the pull frame for effecting commensurate rotation of said plow units in unison so that their cut lines remain parallel, said latter means embodying a crack arm on each plow unit, a draw link pivoted at one end to the crank arm associated with each plow unit which is disposed forwardly of said medial region of the pull frame, and at its other end to the pull frame, draw links pivoted to and extending between the crank arms associated with the plow units which are disposed rearwardly of said medial region of the main frame, and an additional draw link section extending between one of the crank arms associated with a plow unit which is disposed forwardly of said medial region and one of the crank arms which is disposed rearwardly of said medial region.

3. In a tractor-motivated plow system, the combination set forth in claim 2, wherein said additional draw link extends between the crank arm which is associated with the rearmost plow unit forwardly of the medial region of the main frame and the crank arms which are associated with the foremost plow unit rearwardly of said medial region.

4. In a tractor-motivated plow system, the combination set forth in claim 3, wherein the draw links which extend between the crank arm associated with the rearmost plow unit forwardly of said medial region of the main frame and the crank arms associated with all of the plow units rearwardly of said medial region are embodied in a common rigid guide bar.

5. A plow system adapted to be pulled behind a tractor, said system comprising a hitch assembly having facilities whereby it may be attached to the rear end of a tractor, said assembly including a hitch proper which is laterally shiftable relative to the tractor, and a hydraulic ram for shifting said hitch, a pull frame having its forward end connected to said hitch for limited horizontal swinging movement of the frame through a small angle, a main frame having a medial region pivoted to the rear end of said pull frame and inclined relative to the latter, a hydraulic ram effective between the forward end of the main frame and the pull frame for regulating the inclination between the main frame and the pull frame, a series of at least four plow units mounted on said main frame in longitudinally spaced relationship, two of said plow units being disposed forwardly of said medial region of the main frame and at least two plow units being disposed rearwardly of such medial region, said plow units being rotatable about respective vertical axes, and means responsive to the inclination between the main frame and the pull frame for effecting commensurate rotation of said plow units in unison so that their cut lines remain parallel and provide adjustable spacing between furrows created by the plow units when the system is pulled, said latter means embodying a crank arm on each plow unit, a draw link extending between the crank arm associated with the leading plow unit of said two units and the pull frame, a draw link extending between the crank arm associated with the trailing plow unit of said two units and the pull frame, a draw link extending between the crank arms of each pair of adjacent plow units of said at least two plow units, and a draw link extending between the crank arm associated with the trailing plow unit of said two units and the crank arm associated with the leading plow unit of said at least two plow units.

6. In a tractor-motivated plow system, the combination set forth in claim 5, wherein the draw links which extend between the crank arms of adjacent plow units of said at least two plow units is in the form of an elongated guide rod to which said latter crank arms are pivoted, and the draw link which extends between the crank arm of the trailing plow unit of said two units and the crank arm of the leading plow unit of said at least two plow units is a rigid extension of said guide rod.

7. In a tractor-motivated plow system, the combination set forth in claim 6, wherein said hydraulic rams are phased together for operation in unison.

* * * * *